S. H. PRICE.
REAR WHEEL ATTACHMENT FOR TIRE PUMPS.
APPLICATION FILED AUG. 29, 1919.

1,409,023.

Patented Mar. 7, 1922.

Inventor
S. H. Price
By [signature]
Attorney

UNITED STATES PATENT OFFICE.

STANTON H. PRICE, OF CHEHALIS, WASHINGTON.

REAR-WHEEL ATTACHMENT FOR TIRE PUMPS.

1,409,023.  Specification of Letters Patent.  Patented Mar. 7, 1922.

Application filed August 29, 1919. Serial No. 320,653.

*To all whom it may concern:*

Be it known that I, STANTON H. PRICE, a citizen of the United States, residing at Chehalis, in the county of Lewis and State of Washington, have invented certain new and useful Improvements in Rear - Wheel Attachments for Tire Pumps; and I do hereby declare the following to be a full, clear, and exact description of the invention, such as will enable others skilled in the art to which it appertains to make and use the same.

This invention relates to new and useful improvements in rear wheel attachments for tire pumps and has for one of its objects the provision of a device of this character whereby an ordinary reciprocating tire pump can be connected to the rear or traction wheel of an automobile so that the tires of said automobile can be inflated by jacking up and setting in motion the rear or traction wheel.

Another object of this invention is the provision of a clamp that can be easily applied to the traction wheel and which is provided with means so as to connect it to an ordinary tire pump supplied with each automobile, thus obviating the necessity of employing a specially constructed pump for such a purpose.

A further object of this invention is the provision of a rear wheel attachment for tire pumps of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which:—

Figure 1:
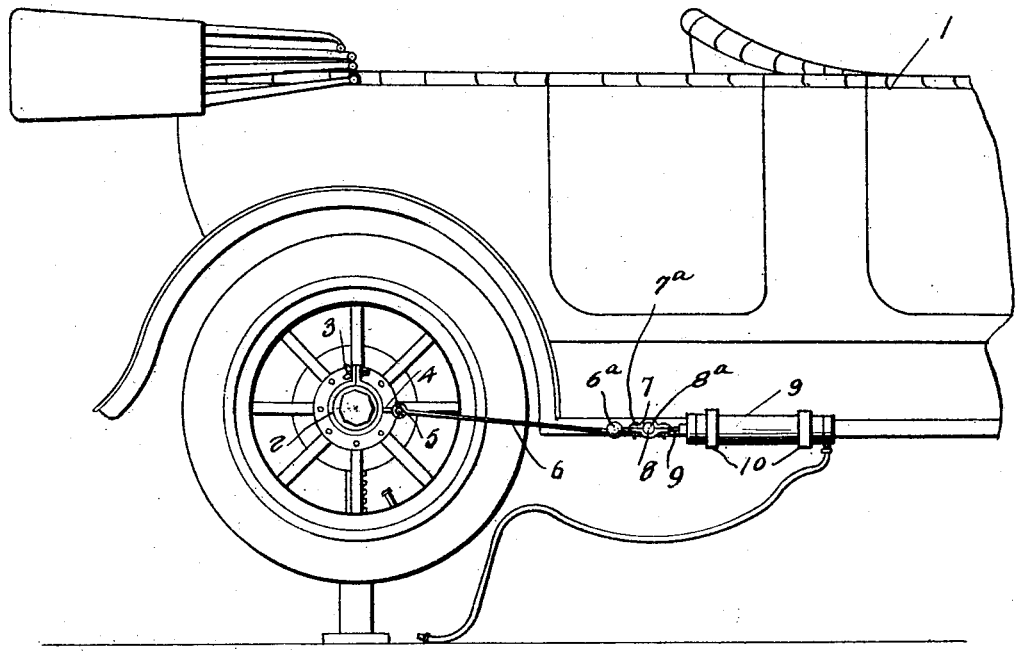
Figures 2, 3:
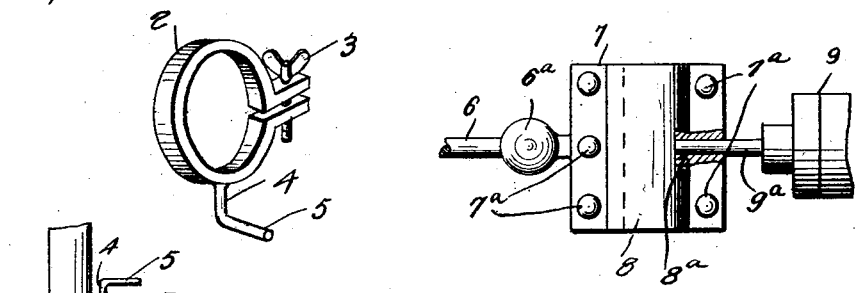
Figure 4:
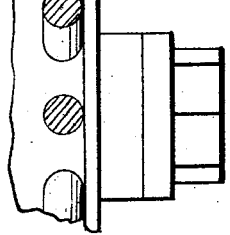

Figure 1 is a side elevation of an automobile having a rear wheel attachment for tire pumps applied thereto and also illustrating the pump applied to the running board of said automobile, Figure 2 is a perspective view of the clamp, Figure 3 is a detail view of the pitman and its clamp for connecting it to the handle of a tire pump, Figure 4 is detail view illustrating the clamp applied to one of the spokes of a traction wheel of an automobile.

Referring in detail to the drawing, the numeral 1 indicates as an entirety an automobile to which my invention is adapted to be applied. A split clamp 2 has its ends disposed parallel and apertured to receive a bolt 3. The openings in the ends of the clamp 2 are preferably screw threaded, so that on threading the bolt 3 through said ends with the clamp applied to the hub of the wheel of the automobile, said clamp will be firmly secured to the hub. An arm 4 is formed upon the clamp 2 and has an angularly related crank portion 5 of a sufficient length to permit the free end thereof to project beyond the mud guard or fender of the automobile. A pitman 6 has one end journaled to the crank 5 and its other end equipped with a clamp 7 adapted to fasten about the handle 8 of a tire pump 9. Clamp 7 is separable and its sections are secured together by bolts 7ª. The tire pump 9 is of the ordinary construction and which is supplied with each automobile when sold. The tire pump 9 is provided with a suitable clamp 10 for the purpose of connecting the cylinders rigidly to the running board of the automobile 1. As the tire pump 9 is of the usual construction the separable clamp 7 cooperates therewith to receive its piston rod 9ª and said transverse handle 8, as in slot 8ª, which must accordingly be V-shaped. The clamp 7 is provided with a universal connection 6ª between itself and the pitman rod 6. The universal joint 6ª is preferably of the well known ball and socket type. By connecting the hose of the pump 9 to any one of the tires of the automobile and jacking up the traction wheel having the clamp 2 applied thereto and setting said wheel in motion, the pump 9 will be actuated to inflate the tire.

Referring to Figure 4 the clamp 2 is shown applied to one of the spokes of the wheel instead of the hub.

While I have shown and described the preferred embodiment of my invention, it will be understood that minor changes in construction, combination and arrangement of parts may be made without departing from the spirit and scope of the invention as claimed.

Having thus described my invention, what I claim is:—

A driving attachment for a pump having a transverse handle, a separable clamp having a T-shaped socket to snugly receive and rigidly retain the handle, and driving means including a pitman and a substantially universal connection between the pitman and clamp.

In testimony whereof I affix my signature in presence of two witnesses.

STANTON H. PRICE.

Witnesses:
E. D. KNIGHT,
A. W. MEMNOTT.